(12) United States Patent
Imai et al.

(10) Patent No.: US 10,644,441 B2
(45) Date of Patent: May 5, 2020

(54) CABLE

(71) Applicant: HORIZON CO., LTD., Kitaazumi-gun, Nagano (JP)

(72) Inventors: Kiyotaka Imai, Nagano (JP); Yasuhiro Imai, Nagano (JP); Sergii Leontiev, Nagano (JP)

(73) Assignee: HORIZON CO., LTD., Nagano (JP)

( * ) Notice: Subject to any disclaimer, the term of this patent is extended or adjusted under 35 U.S.C. 154(b) by 0 days.

(21) Appl. No.: 15/994,099

(22) Filed: May 31, 2018

(65) Prior Publication Data

US 2018/0351291 A1    Dec. 6, 2018

(30) Foreign Application Priority Data

May 31, 2017 (JP) ................................ 2017-108691
Jun. 30, 2017 (JP) ................................ 2017-129239

(51) Int. Cl.
| | | |
|---|---|---|
| H01R 13/58 | (2006.01) | |
| H01R 13/629 | (2006.01) | |
| H04M 1/15 | (2006.01) | |
| H01R 13/56 | (2006.01) | |
| H02J 7/00 | (2006.01) | |

(52) U.S. Cl.
CPC ....... *H01R 13/5833* (2013.01); *H01R 13/562* (2013.01); *H01R 13/582* (2013.01); *H01R 13/5804* (2013.01); *H01R 13/629* (2013.01); *H02J 7/0045* (2013.01); *H04M 1/15* (2013.01); *H01R 13/5845* (2013.01); *H01R 2201/16* (2013.01)

(58) Field of Classification Search
CPC ............ H01R 13/5833; H01R 13/5841; H01R 13/5845; H01R 13/562
See application file for complete search history.

(56) References Cited

U.S. PATENT DOCUMENTS

| | | | | |
|---|---|---|---|---|
| 5,080,608 | A * | 1/1992 | Yarnton | H01R 13/6392 439/457 |
| 5,096,431 | A * | 3/1992 | Byrne | H01R 35/02 439/171 |
| 5,096,434 | A * | 3/1992 | Byrne | H02G 3/288 439/215 |
| 5,199,893 | A * | 4/1993 | Fussell | G01V 1/201 439/271 |
| 5,264,663 | A * | 11/1993 | Noguchi | H01R 12/592 174/84 R |
| 5,605,473 | A * | 2/1997 | Kishon | G06F 1/18 361/679.4 |

(Continued)

FOREIGN PATENT DOCUMENTS

| | | |
|---|---|---|
| JP | 5788608 B2 | 10/2015 |
| WO | 2013070767 A1 | 5/2013 |

*Primary Examiner* — Ross N Gushi
(74) *Attorney, Agent, or Firm* — Cantor Colburn LLP

(57) ABSTRACT

A cable according to the present invention comprising: a connector to be connected to a subject device; a bundle of electric wires for supplying signals and/or power to the connector; and a holding member for holding the connector and the electric wires, the connector and the electric wires being connected inside the holding member, a direction of the connector extending to the outside from the holding member being same with a direction of the electric wire being drawn out to the outside from the holding member.

8 Claims, 20 Drawing Sheets

(56) References Cited

U.S. PATENT DOCUMENTS

| | | | | |
|---|---|---|---|---|
| 6,050,840 A * | 4/2000 | Kowalski | H01R 13/6392 | 439/369 |
| 6,231,375 B1 * | 5/2001 | Kashiyama | H01R 9/2416 | 439/456 |
| 6,302,728 B1 * | 10/2001 | Conorich | H01R 13/5841 | 439/404 |
| 6,422,884 B1 * | 7/2002 | Babasick | H01R 13/5812 | 439/222 |
| 6,457,988 B1 * | 10/2002 | Andersen | H01R 13/567 | 439/137 |
| 7,198,516 B1 * | 4/2007 | Kemelman | H01R 13/5845 | 439/604 |
| 7,232,331 B2 * | 6/2007 | Dennes | H01R 4/2429 | 439/395 |
| 7,264,499 B2 * | 9/2007 | Kondas | H01R 13/72 | 439/456 |
| 7,518,852 B2 * | 4/2009 | Kondas | H01R 13/72 | 174/113 R |
| 7,585,182 B2 * | 9/2009 | Asante | H01R 13/562 | 439/502 |
| 8,002,555 B2 * | 8/2011 | Lee | H01R 13/4538 | 439/49 |
| 8,043,095 B2 * | 10/2011 | Dennes | H01R 4/2429 | 439/395 |
| 8,113,888 B2 * | 2/2012 | Carter | H01R 9/03 | 439/676 |
| 8,323,043 B2 * | 12/2012 | Dennes | H01R 13/6582 | 439/136 |
| 8,888,524 B2 * | 11/2014 | Martin | H01R 13/72 | 439/502 |
| 9,071,010 B2 * | 6/2015 | Cuseo | H01R 13/5833 | |
| 2012/0040542 A1 * | 2/2012 | Cao | H01R 12/53 | 439/83 |
| 2012/0252260 A1 * | 10/2012 | Tseng | H01R 12/62 | 439/499 |

* cited by examiner

CABLE

CROSS-REFERENCE TO RELATED APPLICATIONS

The present application claims priority under 35 U.S.C. § 119 to Japanese patent Application No. 2017-108691 filed on May 31, 2017 and Application No. 2017-129239 filed Jun. 30, 2017 the entire contents of which are incorporated herein by reference.

BACKGROUND OF THE INVENTION

1. Field of the Invention

The present invention relates to a cable with a connector for connecting an external device to an electronic device.

2. Description of Related Art

A cable with a connector for connecting an external device to a portable electronic device such as a smart phone or a tablet-type device is widely available. Such a cable can transmit signals (data, voice, an image, or the like) and supply power for charging or the like between the electronic device and the external device (see JP 5788608 B1, for example). Here, the external device includes another smart phone, a tablet-type device, a personal computer, a charger, or the like.

A conventional cable is likely to be caused a crack on a sheath thereof by frequent bending of a connection between a connector and the cable and even be caused breakage in some cases. Further in a conventional cable, a connector provided on a end of the connector may be deformed by a leverage action of an external force applied to a portion of the connector protruding from an electronic device into which the connector is inserted. In this case, a connector or socket on the electronic device the connector of plug of the cable inserted into may also be deformed. When an electronic device, into which a conventional cable is connected, is accidentally dropped while the electronic device is being carried or operated, the connector of the cable may come off the electronic device due to the absence of a locking mechanism.

In the following description, an electronic device into which a cable can be connected will be referred to as a subject device.

The present invention has been made under such background, and an object of the present invention is to provide a robust cable capable to be connected to an electronic device securely.

BRIEF SUMMARY OF THE INVENTION

The present invention is a cable comprising: a connector to be connected to a subject device; a bundle of electric wires for supplying signals and/or power to the connector; and a holding member for holding the connector and the electric wires, the connector and the electric wires being connected inside the holding member, a direction of the connector extending to the outside from the holding member being same with a direction of the electric wires being drawn out to the outside from the holding member.

In the aforementioned cable, a part of the holding member may be formed as flexibly deformable in accordance with the thickness of a casing of the subject device or a cover case enclosing the casing for the holding member and the connector to pinch a part of the casing or the cover case.

In the aforementioned cable, the part of the holding member formed as flexibly deformable may have a recessed part the thickness of a part of the holding member reduced.

In the aforementioned cable, the part of the holding member formed as flexibly deformable may have a spring helically wound around the electric wires enclosed in the holding member.

In the aforementioned cable, the part of the holding member formed as flexibly deformable may have a leaf spring provided along the electric wired enclosed in the holding member.

In the aforementioned cable, the holding member may have a shape in which the width of the holding member gradually decreases in the direction in which the connector extends to the outside from the holding member.

In the aforementioned cable, the holding member may include a protrusion protruding toward the subject device when the connector is in the state connected to the subject device.

The aforementioned cable may include a cylindrical body through which the electric wires pass, and the holding member may be configured to detachably hold the cylindrical body along the direction in which the electric wires are drawn out to the outside from the holding member.

In the aforementioned cable, the holding member may include first and second members into which the holding member may be split, and the first and second members may be configured to be coupled with sandwiching the connector and the electric wires connected to the connector from both sides.

Another aspect of the present invention is a cover case configured to house a subject device to which the connector of the aforementioned cable is connected, where a locking member that locks the electric wires is provided on an outer side of the cover case.

The present invention can provide a robust cable to be connected to an electronic device securely.

BRIEF DESCRIPTION THE SEVERAL VIEWS OF THE DRAWINGS

Specific embodiments of the present invention will now be described, by way of example only, with reference to the accompanying drawings in which.

DETAILED DESCRIPTION OF THE INVENTION

Figure 1:
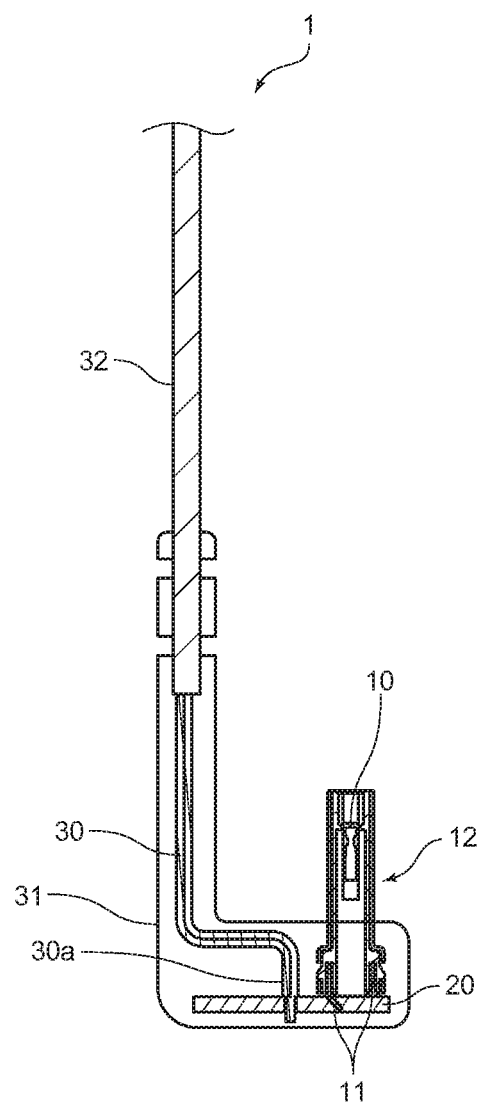
FIG. 1 is a structural diagram of a cable according to an embodiment of the present invention.

A configuration of a cable 1 according to an embodiment of the present invention will be described with reference to FIG. 1. As illustrated in FIG. 1, the cable 1 comprises a connector 12 to be connected to a subject device, a bundle of electric wires 30 through which signals and/or power are supplied to the connector 12, and a holding member 31 holding the connector 12 and the electric wires 30. The connector 12 and the electric wires 30 are connected inside the holding member 31. In the cable 1, a direction in which the connector 12 extends to the outside from the holding member 31 is same with a direction in which the electric wires 30 are drawn out to the outside from the holding member 31. The cable 1 can transfer signals (data, voice, an image, or the like) and supply power for charging or the like between the subject device and an external device connected to the device. Here, the external device may be another smart phone, a tablet-type device, a personal computer, a charger, or the like.

The cable 1 further comprises a substrate 20 for connecting between the connector 12 and the wires 30. The connector 12 comprises a device-side terminal 10 to be connected to the subject device and a substrate-side terminal 11 provided opposite to the device-side terminal 10 to be connected to the substrate. The electric wires 30 are connected to the substrate 20 at an end 30a of the electric wires 30 so that the electric wires 30 are connected to the substrate-side terminal 11 via the substrate 20. In the cable 1, the substrate-side terminal 11 and the end 30a of the electric wires 30 are disposed on the same surface of the substrate 20, where the connector 12 is disposed such that the orientation thereof from the substrate-side terminal 11 to the device-side terminal 10 is substantially perpendicular to the surface of the substrate 20, and at least a part of the end 30a of the electric wires 30 is substantially perpendicular to the surface of the substrate 20 and substantially parallel to the orientation of the connector 12 from the substrate-side terminal 11 to the device-side terminal 10.

The holding member 31 encloses the substrate-side terminal 11, the substrate 20, and the end 30a of the electric wires 30. The electric wires 30 are enclosed by a sheath 32. The holding member 31 may be made of, for example, synthetic resin having flexibility. The sheath 32 may be made of, for example, a typical wire sheath material.

Figure 20:
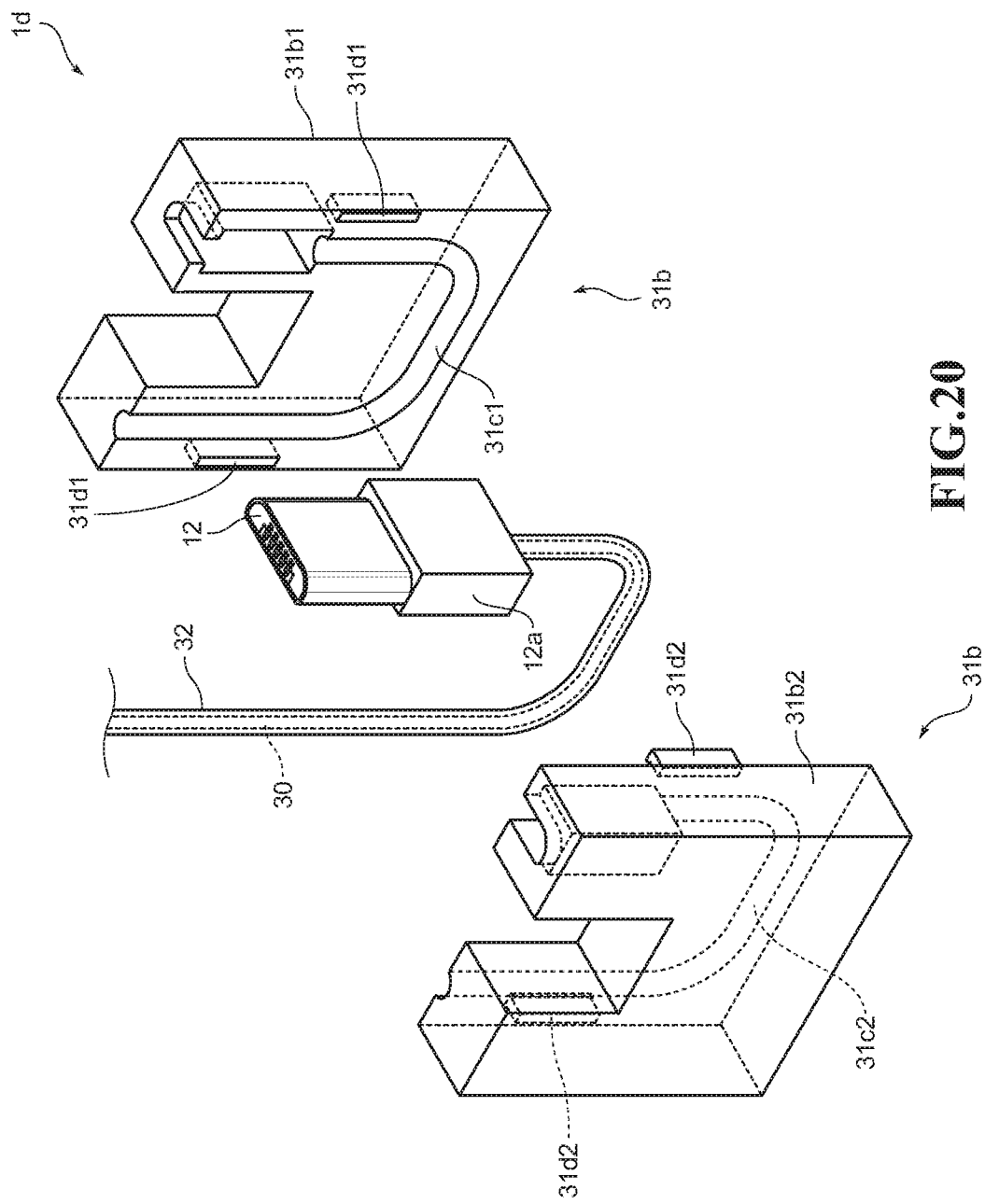
FIG. 20 is a view illustrating a cable according to another embodiment of the present invention, the view illustrating a holding member split into two parts.
Figure 21:
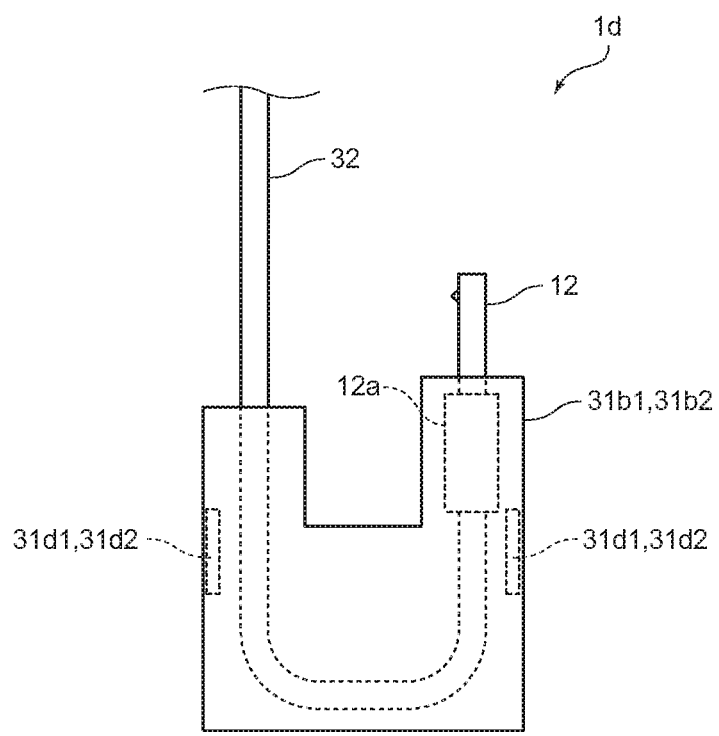
FIG. 21 is a view illustrating a cable according to another embodiment of the present invention and is a side view illustrating states of electric wires and a connector when the two split parts of the holding member are joined.
Figure 22:
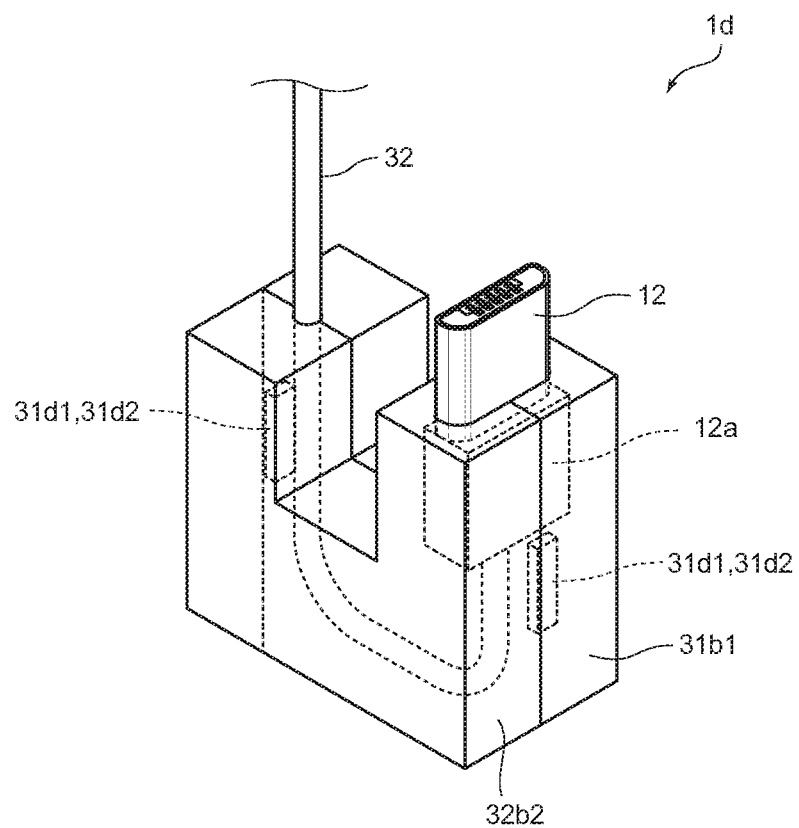
FIG. 22 is a view illustrating a cable according to another embodiment of the present invention and is a perspective view illustrating states of electric wires and the connector when the two split parts of the holding member are joined.

Note that the positional relationship between the substrate 20 and the end 30a of the electric wires 30, between the substrate 20 and the connector 12, and between the end 30a of the electric wires 30 and the connector 12 described herein is merely illustrated as an example and thus may be any positional relationship as long as the direction in which the connector 12 extends to the outside from the holding member 31 and the direction in which the electric wires 30 is drawn out to the outside from the holding member 31 are in the same direction. Moreover, various electronic circuits may be disposed on the substrate 20. Note that as illustrated in FIG. 20 to FIG. 22 of "other embodiments" to be described later, the cable may also be configured without the substrate 20.

Figure 2:
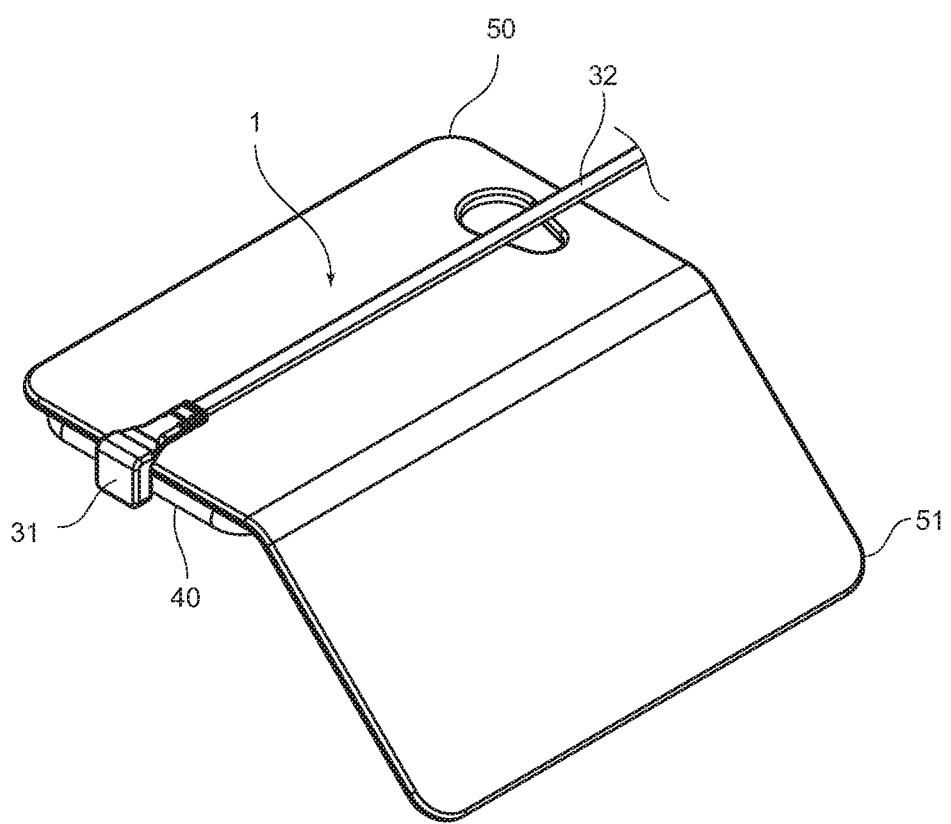
FIG. 2 is a perspective view illustrating a state in which the cable is connected to a smart phone.
Figure 3:
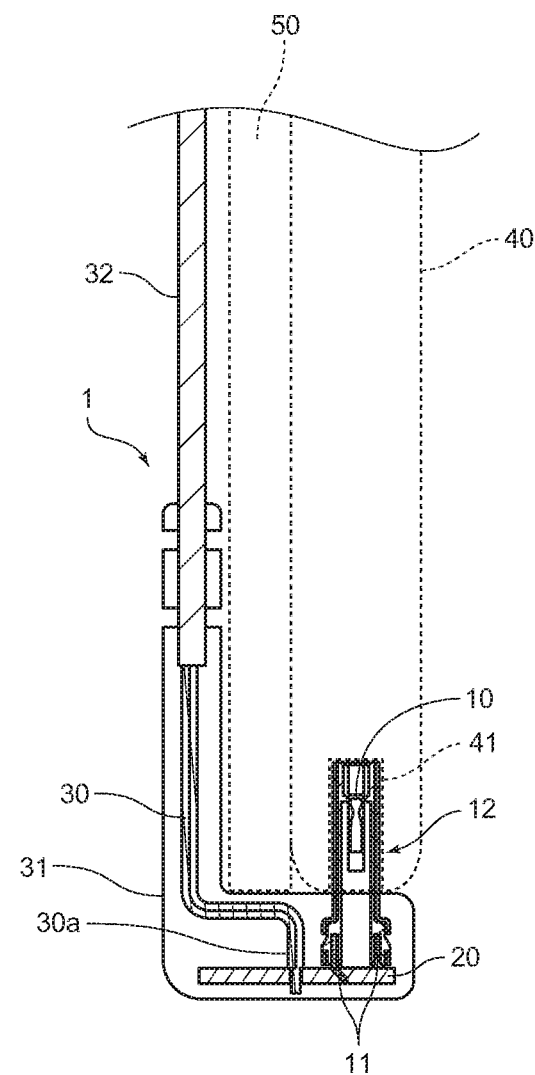
FIG. 3 is a view illustrating the cable in a state in which a connector is connected to the smart phone.

Here will be described a state in which the connector 12 of the cable 1 is connected to a smart phone 40 as an example of the subject device with reference to FIG. 2 to FIG. 6. The subject device is herein assumed to be the smart phone 40 but may be a tablet-type device. The smart phone 40 is housed in a cover case 50 as illustrated in FIG. 2. FIG. 2 illustrates a state in which the cover case 50 is open, where the smart phone 40 is housed such that the back thereof is in contact with the cover case 50, and a flap 51 on the side of a screen (not shown) of the smart phone 40 is opened. When the connector 12 of the cable 1 is connected to a connector 41 of the smart phone 40, as illustrated in FIG. 3, the holding member 31 of the cable 1 is in a state of surrounding an end of the smart phone 40 at which the connector 41 is disposed together with an end of the cover case 50. Moreover, the sheath 32 of the cable 1 is disposed along the surface of the cover case 50 of the smart phone 40. The cable 1 thus forms a U shape with the components including the electric wires 30, the substrate 20, and the connector 12 to be connected to the connector 41 of the smart phone 40. At this time, the holding member 31 acts as a support member for forming the U shape.

Figure 4:
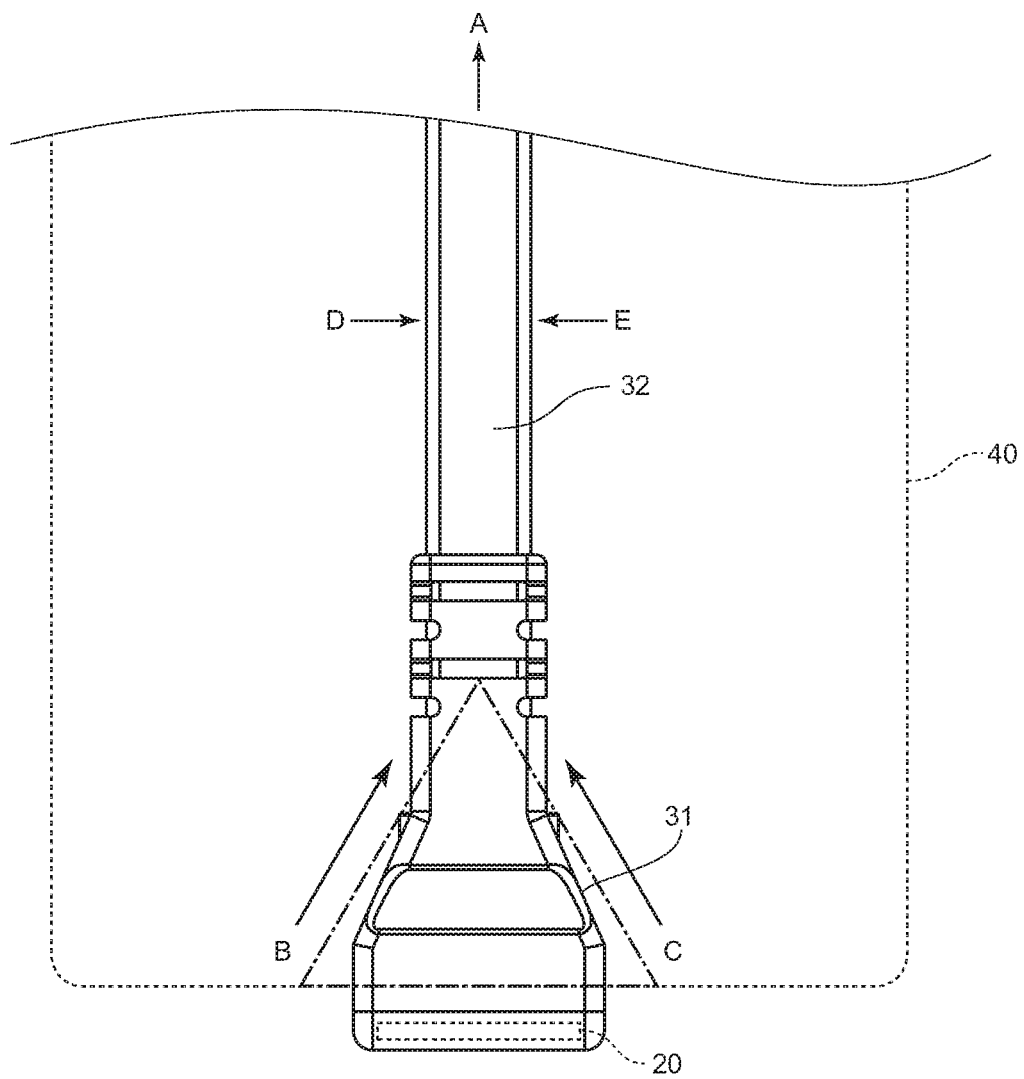
FIG. 4 is a view for explaining the shape and function of a holding member.

As illustrated in FIG. 4, the holding member 31 has such a shape that the width thereof gradually decreases in the direction in which the connector 12 extends to the outside from the holding member 31. That is, the width of the holding member 31 is wide at a portion enclosing the substrate 20 and becomes narrower toward the sheath 32. Accordingly, the widest portion of the holding member 31 may widely support the end of the smart phone 40 at which the connector 41 is disposed. Note that an isosceles triangle indicated by a dash-dotted line in FIG. 4 is a figure that schematically illustrates a distribution of force acting on the holding member 31 when the sheath 32 is pulled in the direction of arrow A.

As described above, the holding member 31 has such a shape that the width thereof gradually decreases in the direction in which the connector 12 extends to the outside from the holding member 31 so that, when the sheath 32 is pulled in the direction of arrow A in FIG. 4, a force acts evenly on the end of the smart phone 40 from directions of arrows B and C that are positioned away from each other at vertices of the base of the isosceles triangle indicated by the dash-dotted line. The smart phone 40 is thus pulled together with the sheath 32 in the direction of arrow A in a well-balanced manner. As a result, when the force in the direction of arrow A is applied to the sheath 32, no excessive force is applied to the connector 12 of the cable 1 and the connector 41 of the smart phone 40, nor does the connector 12 come off the connector 41. Further assuming a situation where a force is applied to the holding member 31 from various external directions, the large contact area between the holding member 31 and the end of the smart phone 40 prevents the external force applied to the holding member 31 from acting on the connector 12 to be able to prevent deformation of the connector 12 and the connector 41. Note that the shape of the holding member 31 may be any shape such as the isosceles triangle, a semicircle, or a fan shape as long as the width gradually decreases in the direction in which the connector 12 extends to the outside as viewed from the holding member 31.

The sheath 32 has a flat shape as illustrated in FIG. 4 and thus is not bent by a force from directions of arrows D and E. Furthermore, a situation where the sheath 32 is bent in a direction orthogonal to arrows D and E is less likely to occur compared to the conventional one disclosed in JP 5788608 B1 because a large portion of the sheath 32 is in contact with the surface of the casing of the smart phone 40, whereby a crack in the sheath 32 or breakage of the electric wires 30 can be prevented. Note that the shape of the sheath 32 is not limited to the flat shape but may be various shapes such as a circle, a quadrangle, a polygon, a star, or the like. In this case as well, the situation where the sheath 32 is bent is less likely to occur compared to the conventional one disclosed in JP 5788608 B1 because a large portion of the sheath 32 is in contact with the surface of the casing of the smart phone 40, whereby a crack in the sheath 32 or breakage of the electric wires 30 can be prevented.

Figure 5:
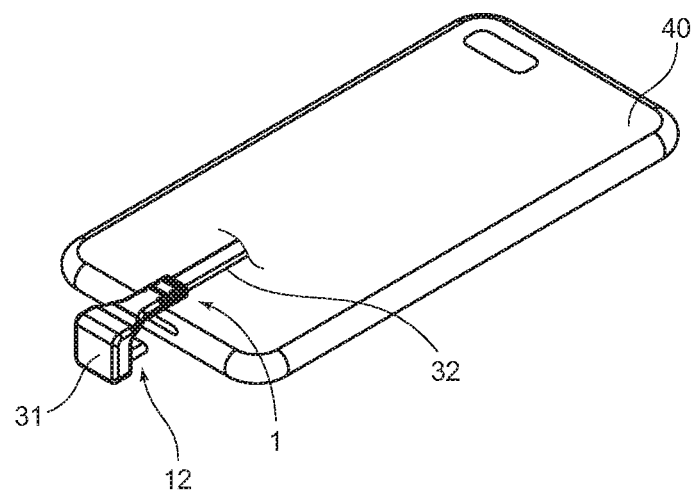
FIG. 5 is a perspective view illustrating the cable in a state before the connector is connected to the smart phone.
Figure 6:
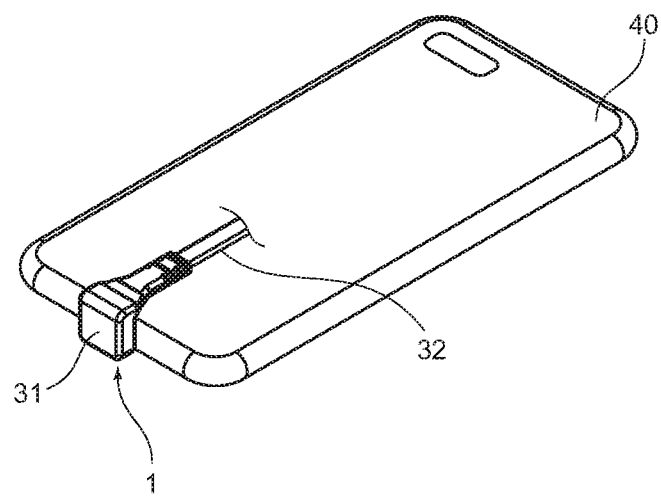
FIG. 6 is a perspective view illustrating the cable in a state in which the connector is connected to the smart phone.

Moreover, although FIG. 2 and FIG. 3 illustrate the example of the smart phone 40 housed in the cover case 50, the cable 1 can of course be used in a state not housed in the cover case 50 as illustrated in FIG. 5 and FIG. 6. In a state where the connector 12 of the cable 1 is inserted into the connector 41 of the smart phone 40, as illustrated in FIG. 5 and FIG. 6, a distance by which the holding member 31 of the cable 1 protrudes from the body of the smart phone 40 can be far shorter than a conventional one as disclosed in JP 5788608 B1 or the like. Accordingly, the leverage action does not work to a large degree even when a force is externally applied to the protruding portion of the cable 1, whereby deformation of the connector 12 of the cable 1 and the connector 41 of the smart phone 40 can be prevented.

Figure 7:
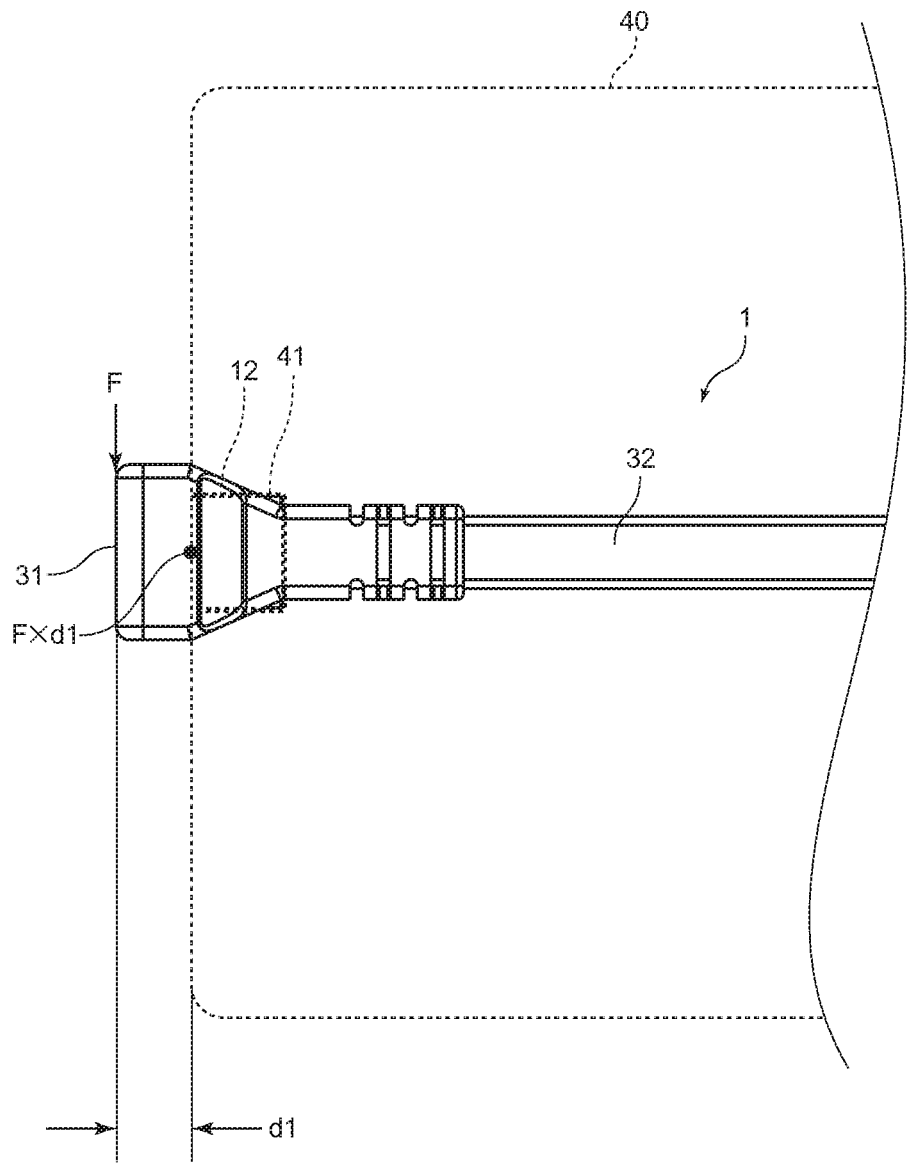
FIG. 7 is a view for explaining moment of a force acting on the holding member.

The effects described with reference to FIG. 5 and FIG. 6 will be described in more detail with reference to FIG. 7 and FIG. 8. As illustrated in FIG. 7, a distance by which the holding member 31 protrudes from the casing of the smart phone 40 equals d1 in the state where the connector 12 of the cable 1 is connected to the connector 41 of the smart phone 40. On the other hand, as illustrated in FIG. 8, a distance by which a body 100 protrudes from the casing of the smart phone 40 equals d2 in a state where a tab 101 of the cable of JP 5788608 B1 is inserted into the connector 41 of the smart phone 40.

Here, it is assumed that a force of magnitude F is applied to a site indicated by arrow F in the holding member 31 of FIG. 7 to cause the leverage action to work with a black circle F×d1 as a fulcrum. At this time, a spot to be the point of action of the lever (not shown) appears at any spot on the connector 12. Here, introducing a concept of moment of force, the black circle F×d1 being the fulcrum serves as an axis of rotation for generating torque of F×d1 at the point of action (not shown) on the connector 12.

Figure 8:
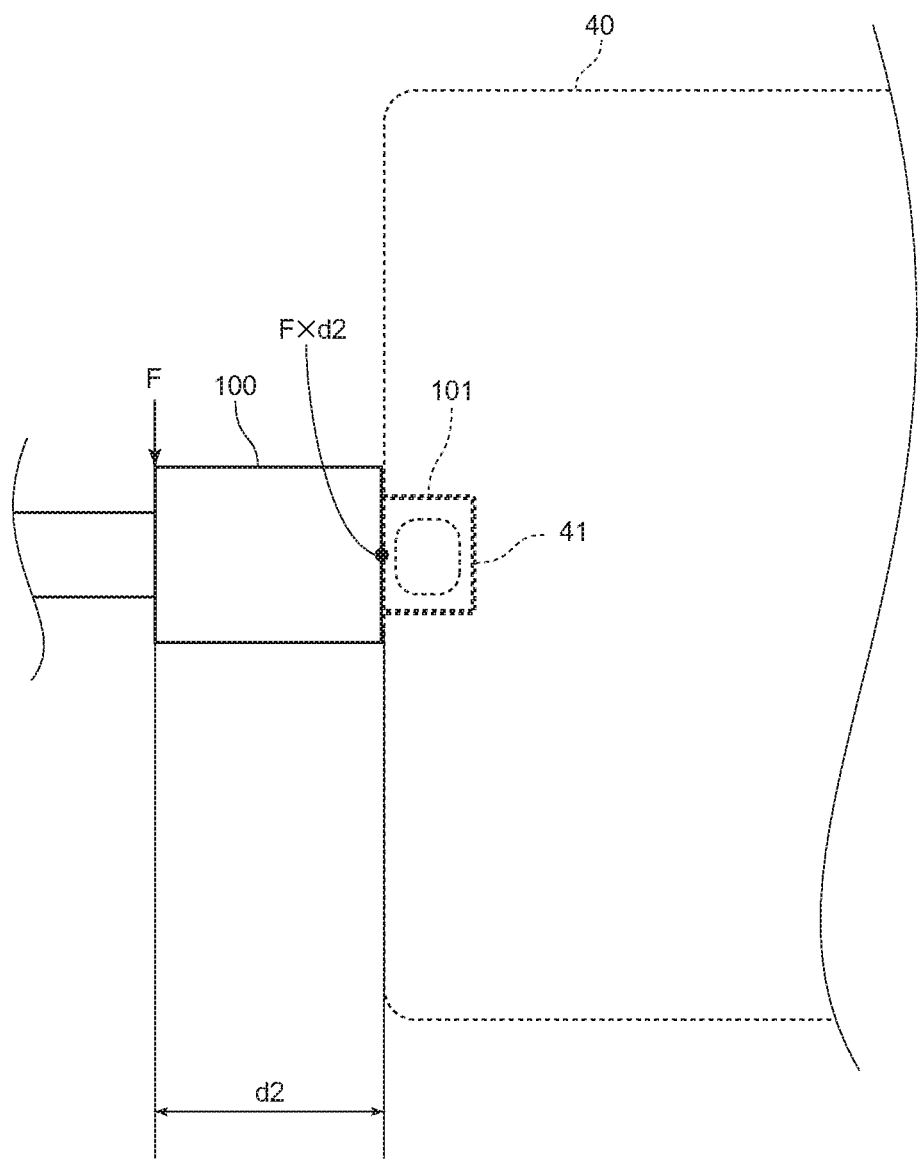
FIG. 8 is a view for explaining moment of a force acting on a body of a conventional cable as a comparative example.

Likewise, it is assumed that a force of magnitude F is applied to a site indicated by arrow F on the body 100 of FIG. 8 to cause the leverage action to work with a black circle F×d2 as a fulcrum. At this time, a spot to be the point of action of the lever (not shown) appears at any spot on the tab 101. Here, introducing the concept of moment of force, the black circle F×d2 being the fulcrum serves as an axis of rotation for generating torque of F×d2 at the point of action (not shown) on the tab 101.

Thus, the force acting on the point of action on each of the connector 12 and the tab 101 caused by the force of magnitude F becomes the force that deforms each of the connector 12 itself, the tab 101 itself, and the connector 41. Here, since d1<d2, the force acting on the point of action on the connector 12 is smaller than the force acting on the point of action on the tab 101 when the force F applied to each of the holding member 31 and the body 100 is equal. As a result, the force that deforms the connector 12 and the connector 41 is smaller than the force that deforms the tab 101 and the connector 41 when the force of magnitude F is externally applied to each of the holding member 31 and the body 100. The leverage action thus does not work to a large degree even when a force is externally applied to the protruding portion (the holding member 31) of the cable 1, whereby deformation of the connector 12 of the cable 1 and the connector 41 of the smart phone 40 can be prevented.

Other Embodiments

Figure 9:
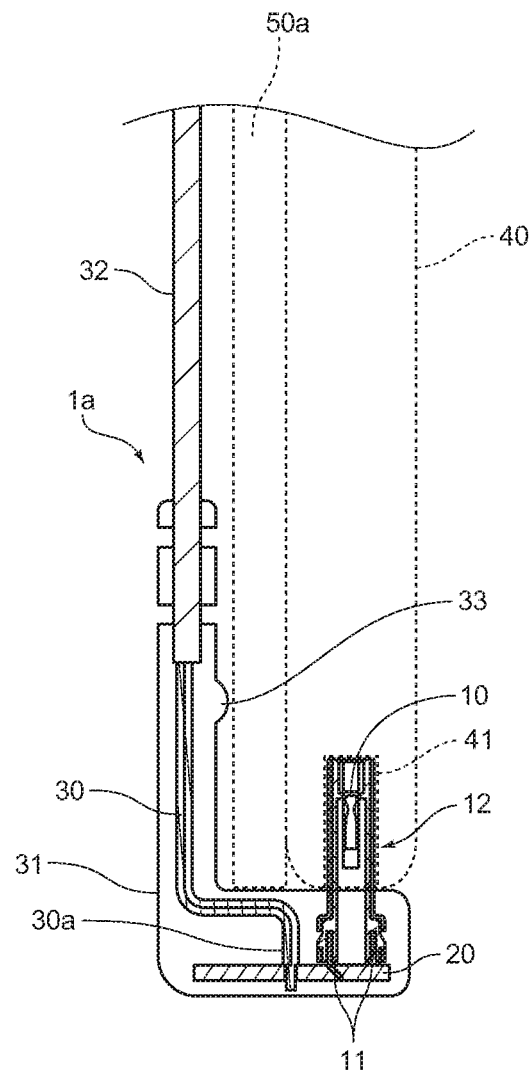
FIG. 9 is a view illustrating a protrusion provided on the holding member.

The aforementioned embodiment can be modified in various ways without departing from the scope thereof. For example, the holding member 31 may be provided with a protrusion 33 that protrudes toward the smart phone 40 when a cable 1a is in a state in which the connector 12 is connected to the connector 41 of the smart phone 40, as illustrated in FIG. 9. Accordingly, when the thickness of a cover case 50a is thinner than that of the cover case 50, the protrusion 33 is interposed between the holding member 31 and the cover case 50a so that the protrusion 33 is brought into contact with the surface of the cover case 50a to be able to prevent an external force applied to the holding member 31 from acting on the connector 12. Alternatively, assuming a case where the smart phone 40 is used in a state not housed in the cover case 50, the height of the protrusion 33 may be made equal to the thickness of the cover case 50. Accordingly, when the smart phone 40 is used without being housed in the cover case 50, the protrusion 33 is interposed between the holding member 31 and the casing of the smart phone 40 so that the protrusion 33 is brought into contact with the surface of the casing of the smart phone 40 to be able to prevent the external force applied to the holding member 31 from acting on the connector 12.

Figure 10:
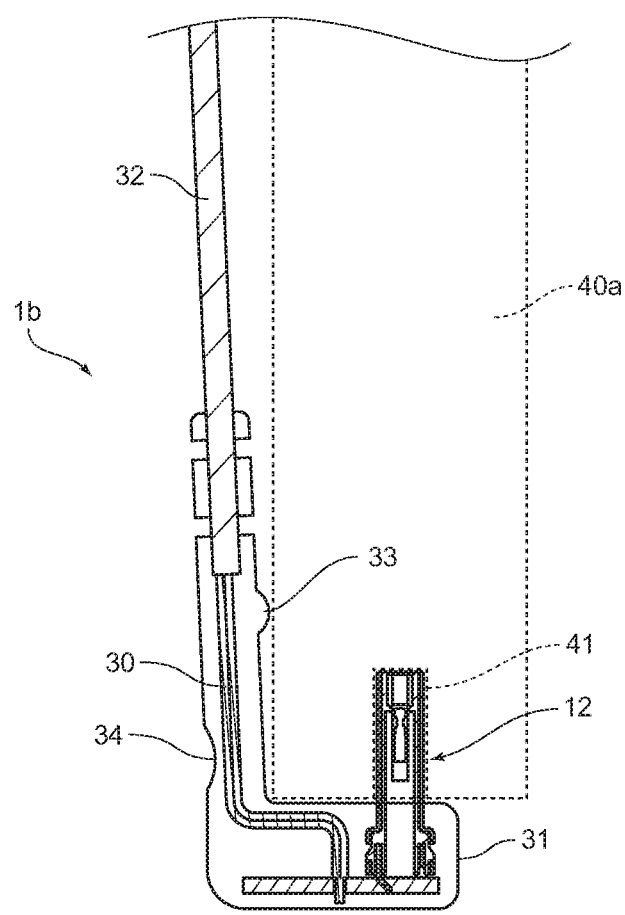
FIG. 10 is a view illustrating a recess provided on the holding member.

Moreover, as illustrated in FIG. 10, a part of a casing or a cover case (not shown in FIG. 10) covering the casing of a tablet-type device 40*a* is placed between the holding member 31 and the connector 12 when the connector 12 is in a state connected to the connector 41 of the tablet-type device 40*a*, where at least a part of the holding member 31 may be formed as flexibly deformable in accordance with the thickness of the casing or the cover case. The flexibly deformable part may be configured, for example, as a recess 34 formed on a part of the holding member 31 by reducing the thickness thereof. Flexibility of the holding member 31 can be improved by reducing the thickness of a part of the holding member 31 as with the recess 34. A cable 1*b* can thus be used even when the thickness of a subject device connected to the connector 12 is thicker than that of the smart phone 40, so that the cable 1*b* can be used for an increased number of types of devices. The protrusion 33 may be omitted in this case.

Figure 11:
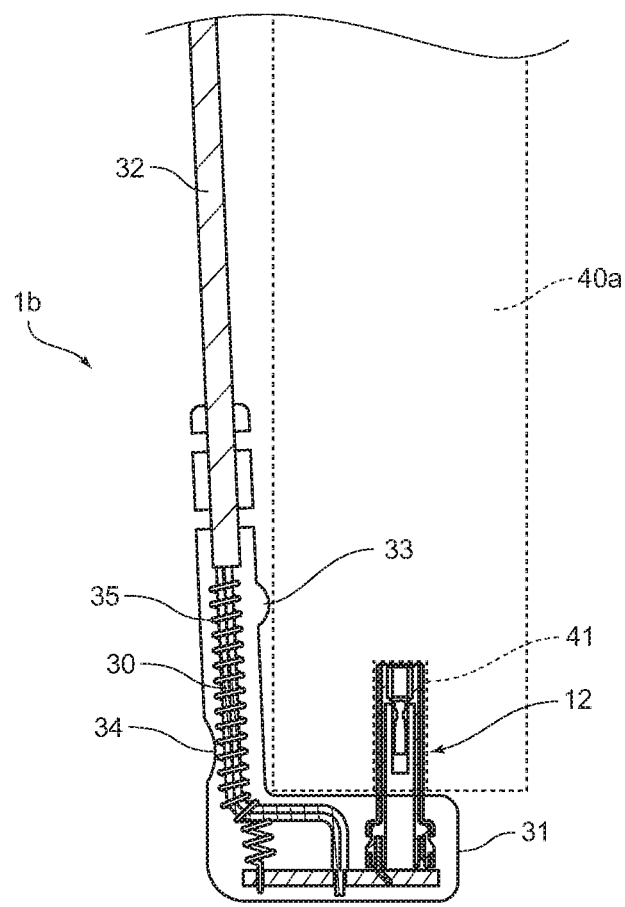
FIG. 11 is a view illustrating a cable according to another embodiment of the present invention, the view illustrating a spring wound around the electric wire.
Figure 12:
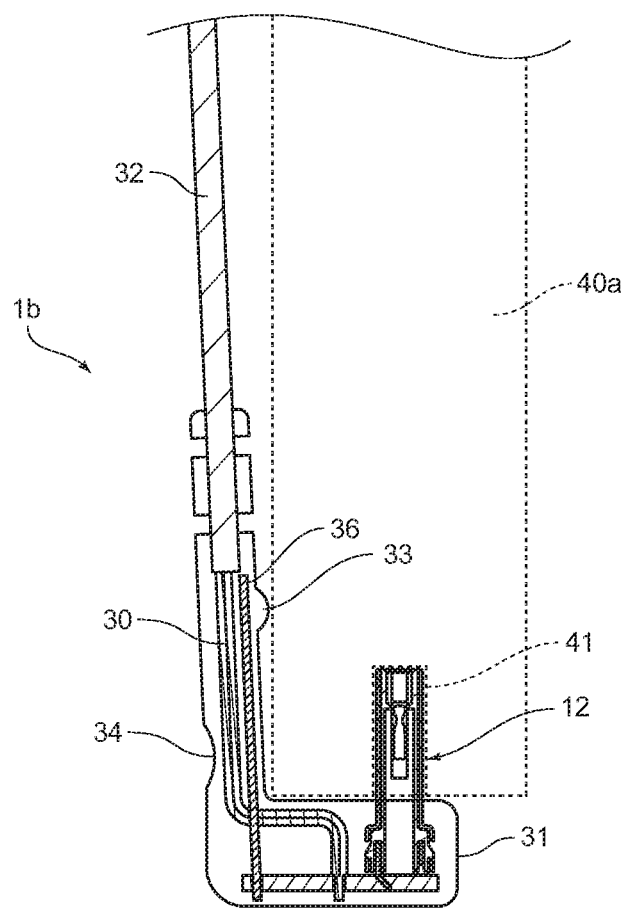
FIG. 12 is a view illustrating a cable according to another embodiment of the present invention, the view illustrating a leaf spring disposed along the electric wire.

Moreover, as illustrated in FIG. 11, a spring 35 helically wound around the electric wires 30 enclosed in the holding member 31 may be used as the flexibly deformable part. According to this configuration, elasticity of the spring 35 is added in addition to the elasticity of the holding member 31 itself to be able to enhance the force that allows the holding member 31 to return to the original shape (that is, the shape in which the electric wires 30 are substantially perpendicular to the substrate 20) when the tablet-type device 40*a* is detached from the connector 12. As another means for obtaining a similar effect, the flexibly deformable part mat be configured by a leaf spring 36 provided along the electric wires 30 that is enclosed in the holding member 31, as illustrated in FIG. 12.

Figure 13:
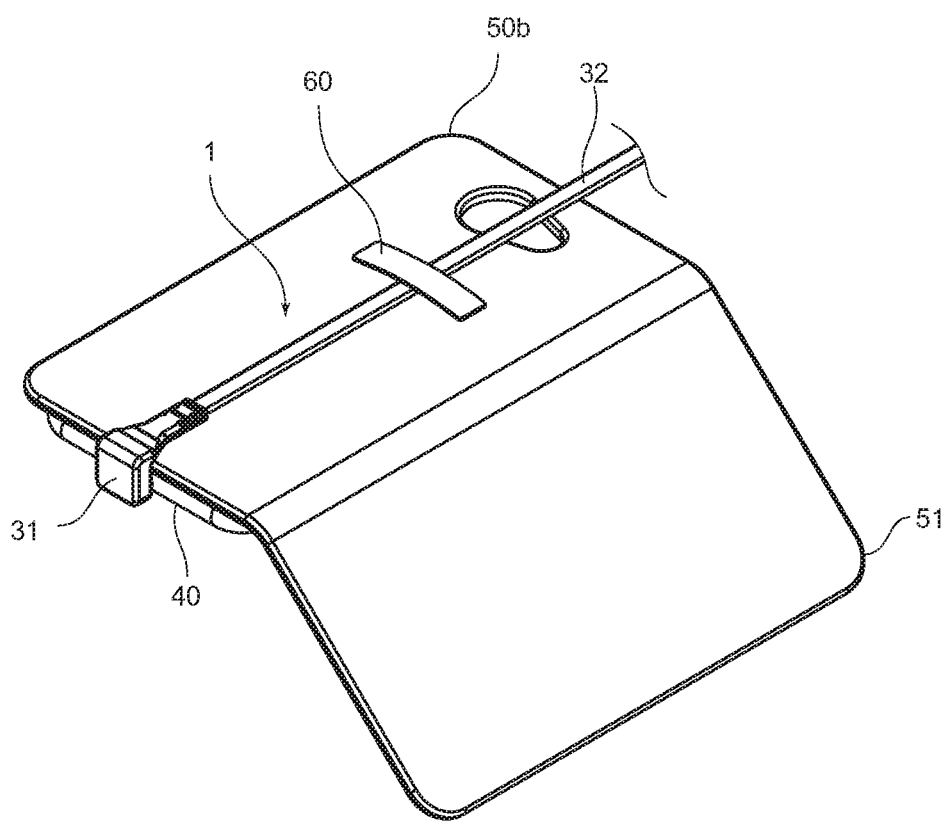
FIG. 13 is a view illustrating a cable according to another embodiment of the present invention, the view illustrating a locking member provided in a case.

Moreover, as illustrated in FIG. 13, a locking member 60 for locking the electric wires 30 may be provided on the outer side of a cover case 50*b*. The locking member 60 locks the electric wires 30 so as to cover the sheath 32 of the electric wires 30. This can prevent the electric wires 30 from being bent at the boundary between the holding member 31 and the sheath 32 by the forces from the directions of arrows D and E as well as prevent the electric wires 30 from being bent at the boundary between the holding member 31 and the sheath 32 by the forces from the directions orthogonal to arrows D and E, as described with reference to FIG. 4. As a result, a crack in the sheath 32 and breakage of the electric wires 30 can be prevented.

The locking member 60 further prevents the sheath 32 from coming off the surface of the cover case 50*b* when the sheath 32 is pulled in the direction of arrow A in FIG. 4, so that the smart phone 40 housed in the cover case 50*b* is certainly pulled in the direction of arrow A as well. The smart phone 40 thus does not tilt in the direction orthogonal to arrow A when the sheath 32 is pulled in the direction of arrow A, whereby a situation where the connector 12 comes off the connector 41 of the smart phone 40 and falls or the like can be prevented. Specifically, the connector 12 does not come off the connector 41 of the smart phone 40 even when the smart phone 40 is accidentally dropped with the cable 1 being connected to the smart phone 40, in which case the smart phone 40 results in a state hanging in the air by the tension of the electric wires 30. This can prevent the smart phone 40 from colliding with the floor or the like and being damaged.

Figure 14:
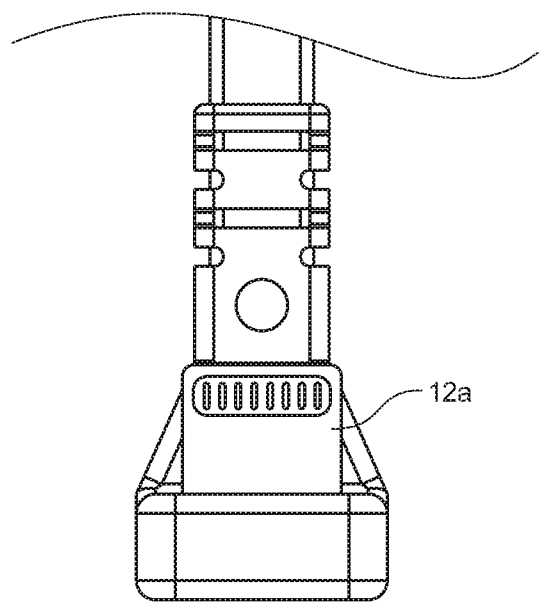
FIG. 14 is a view illustrating a cable according to another embodiment, the view illustrating an example in which a connector is a Lightning connector.
Figure 15:
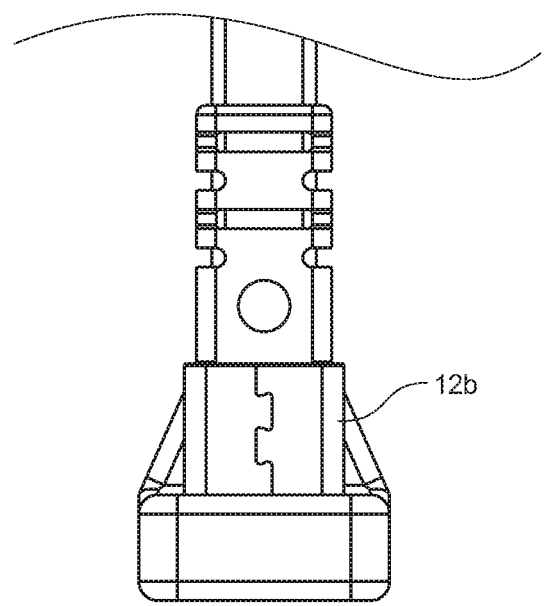
FIG. 15 is a view illustrating a cable according to another embodiment of the present invention, the view illustrating an example in which a connector is a micro USB connector.
Figure 16:
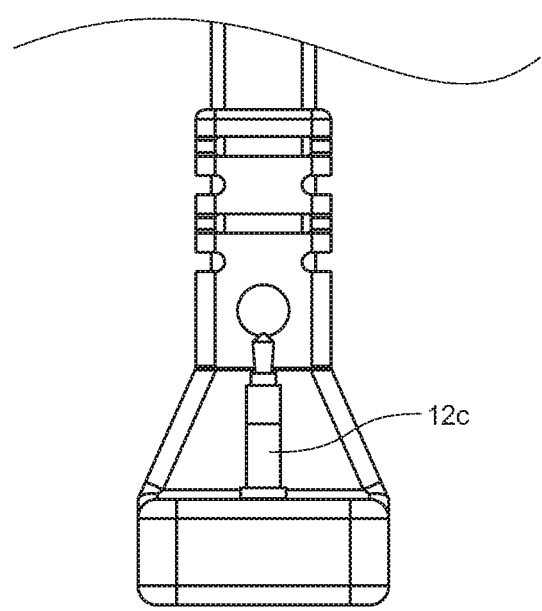
FIG. 16 is a view illustrating a cable according to another embodiment of the present invention, the view illustrating an example in which a connector is a phone plug.

Although the above embodiment assumes the connector 12 of the cable 1 to be a USB Type-C connector, the connector 12 may be changed to various other connectors. For example, FIG. 14 shows a connector 12*a* as a Lightning connector. FIG. 15 shows a connector 12*b* as a micro USB connector. FIG. 16 shows a connector 12*c* as a phone plug. Although not described, another end of the cable 1 may be in any form. The cable 1 can thus transfer signals (data, voice, an image, and the like) as a signal transferring cable or an earphone cable and supply power for charging or the like as a power supply cable between a subject device connected to the connector 12 and an external device to which the other end of the cable 1 is connected.

Figure 17:
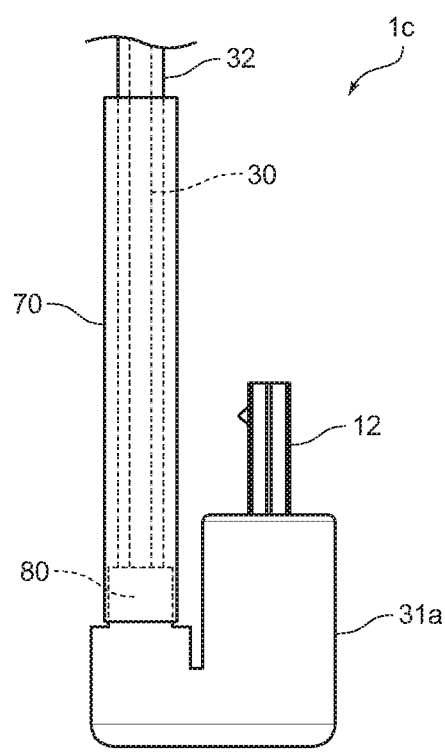
FIG. 17 is a view illustrating a cable according to another embodiment of the present invention, the view illustrating a state in which a cylindrical body is held in a holding member.

As illustrated in FIG. 17, the cable 1*c* may comprise a cylindrical body 70 through which the electric wires 30 pass, and a holding member 31*a* may comprise a cylindrical body holder 80 for detachably holding the cylindrical body 70 along the direction in which the electric wires 30 are drawn out to the outside from the holding member 31*a*.

Since the electric wires 30 are enclosed by the sheath 32 as illustrated in FIG. 17, the cylindrical body 70 has a hollow of a size allowing passage of the electric wires 30 enclosed by the sheath 32 therethrough. A cross section of the cylindrical body 70 in a direction orthogonal to the direction of passage of the electric wires 30 may be of any shape such as a circle, a semicircle (D-shape), a triangle, a quadrangle, or the like as long as the electric wires 30 including the sheath 32 can pass through the cylindrical body.

The cylindrical body 70 may be structured to be split into two along the direction of passage of the electric wires 30 through the cylindrical body 70. Two such split parts of the cylindrical body 70 may be joined together to form one cylindrical body 70. In order to join the two split parts of the cylindrical body 70, a claw may be provided in one of the two split parts of the cylindrical body 70 while a hole to which the claw is fitted may be provided in the other. Note that the cylindrical body 70 may be split into not only two but any number of parts such as three parts or four parts.

The cylindrical body holder 80 may be structured such that, when an end of the cylindrical body 70 is inserted into the cylindrical body holder as in FIG. 17, the frictional force between the inner periphery of the end of the cylindrical body 70 and the outer periphery of the cylindrical body holder 80 prevents the cylindrical body 70 from easily falling off the cylindrical body holder 80. The cylindrical body holder 80 is not limited thereto. For example, the inner periphery of the end of the cylindrical body 70 and the outer periphery of the cylindrical body holder 80 may be threaded such that the inner periphery of the end of the cylindrical body 70 and the outer periphery of the cylindrical body holder 80 are screwed together. The cylindrical body holder may be structured such that the cylindrical body 70 does not easily fall off the cylindrical body holder 80 by providing a protrusion or recess on the inner periphery of the end of the cylindrical body 70 and a recess or protrusion on the outer periphery of the cylindrical body holder 80 and allowing the protrusion or recess to be fitted to the recess or protrusion when the cylindrical body 70 is inserted into the cylindrical body holder 80.

The cylindrical body 70 may be made of material such as metal or synthetic resin that preferably has rigidity allowing a side surface of the holding member 31*a* on the side of the connector 12 and the cylindrical body 70 to sandwich the casing of the smart phone 40 or the cover case 50 of the smart phone 40 when the connector 12 is connected to the smart phone 40. The cylindrical body 70 is also preferably made of material having flexibility that allows the cylindrical body 70 to flex when the thickness of the casing of the smart phone 40 or the thickness of the cover case 50 of the smart phone 40 is larger than the distance between the side surface of the holding member 31*a* on the side of the connector 12 and the cylindrical body 70.

Figure 18:
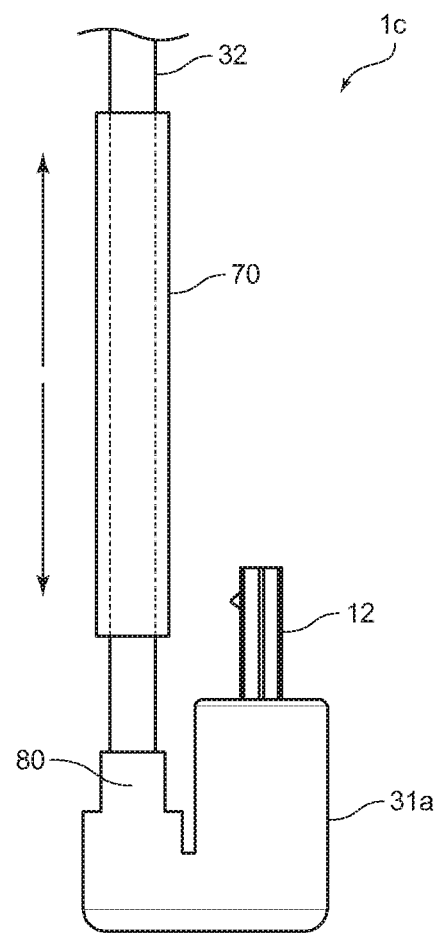
FIG. 18 is a view illustrating a cable according to another embodiment of the present invention, the view illustrating a state in which the cylindrical body is detached from the holding member.
Figure 19:
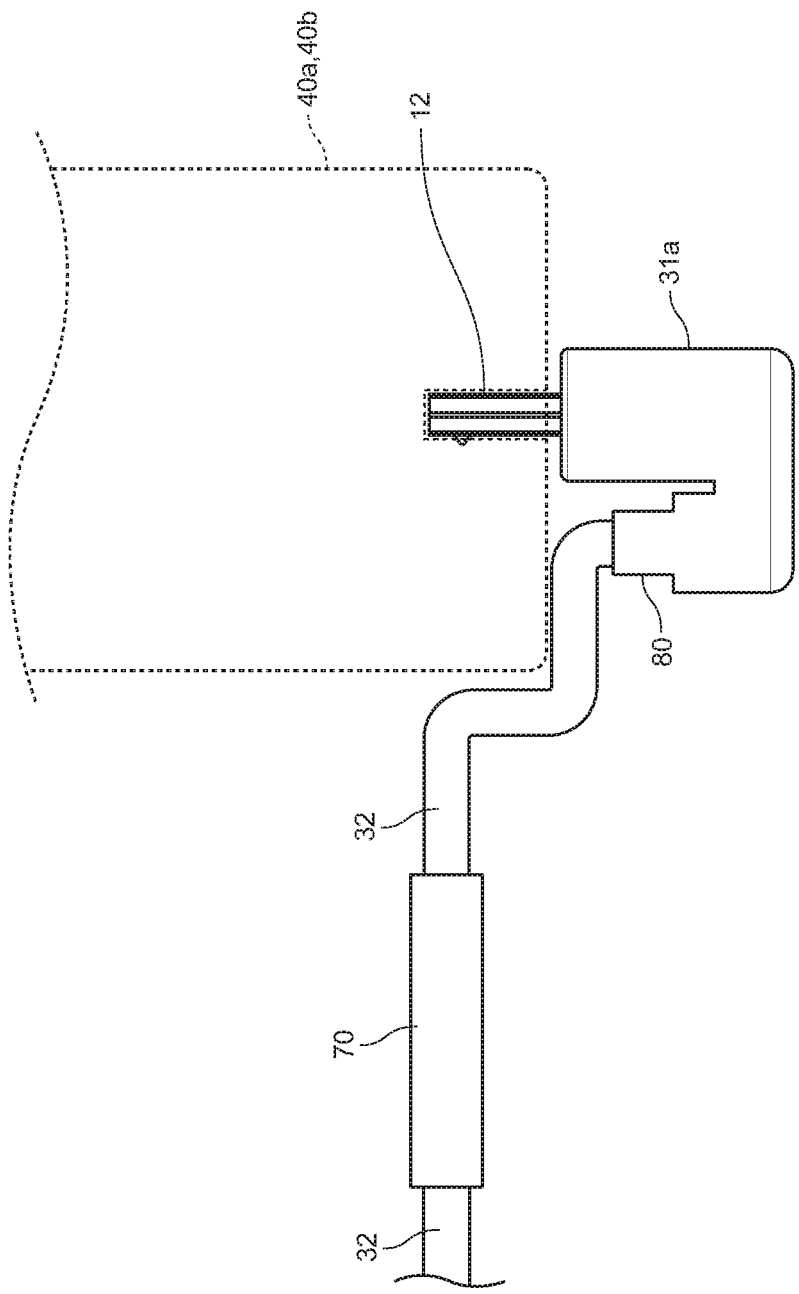
FIG. 19 is a view illustrating a cable according to another embodiment of the present invention, the view illustrating a state in which the cable is connected to a tablet-type device or a personal computer.

As illustrated in FIG. 18, the cylindrical body 70 can be pulled out of the cylindrical body holder 80 so that the cylindrical body holder 80 can detachably hold the cylindrical body 70. The cylindrical body 70 thus does not get in the way when the connector 12 is connected to a subject device such as the tablet-type device 40a or a personal computer 40b having the thickness larger than that of the smart phone 40 with the cylindrical body 70 being pulled out of the cylindrical body holder 80 as illustrated in FIG. 19.

As described above, in a state in which the cylindrical body 70 is fitted in the cylindrical body holder 80, the cable 1c can be used while connected to the smart phone 40 as with the cable 1 described in the aforementioned embodiment. On the other hand, the cable 1c can also be used while connected to a subject device such as the tablet-type device 40a or the personal computer 40b having the thickness larger than that of the smart phone 40 by pulling the cylindrical body 70 out of the cylindrical body holder 80.

In a cable 1d illustrated in FIG. 20, a holding member 31b comprises of first and second members 31b1 and 31b2 into which the holding member can be split. The first and second members 31b1 and 31b2 are provided with grooves 31c1 and 31c2 for sandwiching the connector 12 and the electric wires 30 from both sides. Recesses 31d1 are provided on the first member 31b1 while protrusions 31d2 are provided on the second member coupling the first and second members 31b1 and 31b2.

The electric wires 30 including the sheath 32, a part of the connector 12, and a substrate 12a of the connector 12 are fitted in the grooves 31c1 and 31c2.

The recess 31d1 and the protrusion 31d2 are shaped such that the protrusion 31d2 is inserted into the recess 31d1 in order to join the first and second members 31b1 and 31b2. At this time, the protrusion 31d2 and the recess 31d1 are structured such that, when the protrusion reaches the innermost part of the recess, a claw (not shown) provided at a tip of the protrusion 31d2 is hooked onto a step (not shown) provided at the innermost part of the recess 31d1 and that the protrusion 31d2 does not easily come off the recess 31d1.

FIG. 21 and FIG. 22 illustrate the cable 1d in which the first and second members 31b1 and 31b2 are coupled so as to sandwich the electric wires 30 (including the sheath 32) and the connector 12 (including the substrate 12a). The cable td can thus be made using a connector (including the substrate 12a) to which commercially available electric wires 30 (including the sheath 32) are connected. For example, when a user already owns a connector (including the substrate 12a) to which commercially available electric wires 30 (including the sheath 32) is connected, the user can make the cable 1d by newly purchasing the first and second members 31b1 and 31b2. As a result, the cable 1d can be obtained at a lower cost than when the cable 1d is newly purchased. Furthermore, when the connector (including the substrate 12a) to which the commercially available electric wires 30 (including the sheath 32) is connected is to be used in its original state again, the connector (including the substrate 12a) to which the commercially available electric wires 30 (including the sheath 32) is connected can be restored to its original state by discounting the first and second members 31b1 and 31b2 and taking out the connector.

Furthermore, although the examples of FIG. 20 to FIG. 22 illustrate the structure in which the first and second members 31b1 and 31b2 are detachable, the first and second members 31b1 and 31b2 can of course be made undetachable by an adhesive, welding, or the like.

What is claimed is:

1. A cable comprising:
a connector to be connected to an end of a subject device;
a bundle of electric wires for supplying signals and/or power to the connector;
a holding member for holding the connector and the electric wires, the connector and the electric wires being connected inside the holding member, a direction of the connector extending to the outside from the holding member being same with a direction of the electric wire being drawn out to the outside from the holding member, and the holding member having a shape in which the width of the holding member, at a part corresponding to the projecting length of the connector from the holding member, gradually decreases in the direction of the connector extending to the outside from the holding member, and
a substrate to which a substrate-side terminal of the connector, provided opposite to a device-side terminal of the connector to be connected to the substrate devise, and an end of the electric wires are connected on a same surface of the substrate, wherein the connector is disposed such that the orientation thereof from the substrate-side terminal to the device-side terminal is substantially perpendicular to the surface of the substrate, and at least a part of the end of the electric wires is substantially perpendicular to the surface of the substrate.

2. The cable according to claim 1, wherein:
a part of a casing or a cover case enclosing the casing of the subject device is placed between the holding member and the connector when the connector is in a state connected to the subject device, and
at least a part of the holding member is formed as flexibly deformable in accordance with the thickness of the casing or the cover case.

3. The cable according to claim 2, wherein:
the part of the holding member formed as flexibly deformable has a recess which is a part of the holding member with a reduced thickness.

4. The cable according to claim 3, wherein:
the part of the holding member formed as flexibly deformable has a spring helically wound around the electric wires enclosed in the holding member.

5. The cable according to claim 3, wherein
the part of the holding member formed as flexibly deformable has a leaf spring provided along the electric wires enclosed in the holding member.

6. The cable according to claim 3, wherein:
the holding member includes a protrusion protruding toward the subject device when the connector is in the state connected to the subject device.

7. The cable according to claim 1, further comprising:
a cylindrical body through which the electric wire passes, wherein:
the holding member is configured to detachably hold the cylindrical body along the direction of the electric wires drawn out to the outside from the holding member.

8. The cable according to claim 1, wherein:
the holding member includes first and second members into which the holding member can be split, and
the first and second members include is configured to be coupled with sandwiching the connector and the electric wires connected to the connector from both sides.

* * * * *